United States Patent
Abhiram et al.

(10) Patent No.: US 10,740,964 B2
(45) Date of Patent: Aug. 11, 2020

(54) THREE-DIMENSIONAL ENVIRONMENT MODELING BASED ON A MULTI-CAMERA CONVOLVER SYSTEM

(71) Applicant: Recogni Inc., Cupertino, CA (US)

(72) Inventors: Shabarivas Abhiram, Mountain View, CA (US); Gilles J. C. A. Backhus, Munich (DE); Eugene M. Feinberg, San Jose, CA (US); Berend Ozceri, Los Gatos, CA (US); Martin Stefan Patz, Munich (DE)

(73) Assignee: Recogni Inc., San Jose, CA (US)

( * ) Notice: Subject to any disclaimer, the term of this patent is extended or adjusted under 35 U.S.C. 154(b) by 0 days.

(21) Appl. No.: 16/273,618

(22) Filed: Feb. 12, 2019

(65) Prior Publication Data

US 2019/0287297 A1    Sep. 19, 2019

Related U.S. Application Data

(60) Provisional application No. 62/690,509, filed on Jun. 27, 2018, provisional application No. 62/642,578, filed on Mar. 13, 2018.

(51) Int. Cl.
| | |
|---|---|
| *G06T 17/05* | (2011.01) |
| *G06N 20/00* | (2019.01) |
| *H04N 7/18* | (2006.01) |
| *G06T 7/593* | (2017.01) |
| *G06T 7/246* | (2017.01) |
| *G06T 7/579* | (2017.01) |

(52) U.S. Cl.
CPC ............. *G06T 17/05* (2013.01); *G06N 20/00* (2019.01); *G06T 7/246* (2017.01); *G06T 7/579* (2017.01); *G06T 7/596* (2017.01); *H04N 7/181* (2013.01)

(58) Field of Classification Search
CPC ......... G06T 17/05; G06T 7/596; G06N 20/00; H04N 7/181
USPC ....................................................... 345/619
See application file for complete search history.

(56) References Cited

U.S. PATENT DOCUMENTS

| | | | |
|---|---|---|---|
| 9,612,123 | B1 | 4/2017 | Levinson et al. |
| 9,958,864 | B2 | 5/2018 | Kentley-Klay et al. |
| 2015/0243038 | A1* | 8/2015 | Zhao .................. G06K 9/00348 382/103 |
| 2017/0186176 | A1 | 6/2017 | Paluri |
| 2019/0026956 | A1* | 1/2019 | Gausebeck ............. G06T 19/20 |
| 2019/0049958 | A1 | 2/2019 | Liu et al. |
| 2019/0108396 | A1* | 4/2019 | Dal Mutto ......... G06K 9/00664 |
| 2019/0197709 | A1* | 6/2019 | Windmark ................ G06T 7/33 |

OTHER PUBLICATIONS

Tung, H.Y., Tung, H.W., Yumer, E., Fragkiadaki, K.: Self-supervised learning of motion capture. In: Advances in Neural Information Processing Systems. pp. 5242-5252 (2017).*

(Continued)

*Primary Examiner* — Jin Ge
(74) *Attorney, Agent, or Firm* — Ascenda Law Group, PC

(57) ABSTRACT

A three-dimensional model of the environment of one or more camera devices is determined, in which image processing for inferring the model may be performed at the one or more camera devices.

16 Claims, 5 Drawing Sheets

(56) References Cited

OTHER PUBLICATIONS

Tung, H.Y., Harley, A., Seto, W., Fragkiadaki, K.: Adversarial inverse graphics networks: Learning 2d-to-3d lifting and image-to-image translation from unpaired supervision. In: The IEEE International Conference on Computer Vision (ICCV). vol. 2 (2017).*
Fayyaz; et al., "STFCN: Spatio-Temporal FCN for Semantic Video Segmentation", Computer Vision and Pattern Recognition, arXiv:submit/1653436 [cs.CV] (Sep. 1, 2016), 18 pages.
Klein; et al., "Improving the Agility of Keyframe-Based SLAM", European Conference on Computer Vision (2008), Proceedings of the 10th European Conference on Computer Vision: Part II, pp. 802-815.
Lea; et al., "Temporal Convolutional Networks: A Unified Approach to Action Segmentation", Computer Vision and Pattern Recognition, arXiv:1608.08242 [cs.CV] (Aug. 29, 2016), 4 pages.
International Search Report and Written Opinion dated May 23, 2019, from the ISA/European Patent Office, for International Patent Application No. PCT/US2019/017789 (filed Feb. 13, 2019), 17 pages.
Fuentes-Pacheco; et al., "Visual simultaneous localization and mapping: a survey", Artificial Intelligence Review (2015), 45:55-81.

Vijayanarasimhan; et al., "SfM-Net: Learning of Structure and Motion from Video", Cornell University (Apr. 25, 2017), arXiv:1704.07804v1 [cs.CV], 9 pages.
Yin; et al., "GeoNet: Unsupervised Learning of Dense Depth, Optical Flow and Camera Pose", 2018 IEEE/CVF Conference on Computer Vision and Pattern Recognition, Mar. 6, 2018, arXiv:1803.02276v1 [cs.CV], pp. 1983-1992.
Zhao; et al., "Learning monocular visual odometry with dense 3D mapping from dense 3D flow", 2018 IEEE/RSJ International Conference on Intelligent Robots and Systems (IROS), Mar. 6, 2018, arXiv:1803.02286v1 [cs.RO], pp. 6864-6871.
Ko; et al., "Edge-Host Partitioning of Deep Neural Networks with Feature Space Encoding for Resource-Constrained Internet-of-Things Platforms", Cornell University (Feb. 11, 2018), arXiv:1802.03835v1 [cs.CV], 7 pages.
Lawrence-Berkeley, "Could edge computing resolve a cluster of driverless technology problems?", AutoSens (Mar. 6, 2018), Blog, retrieved from: https://auto-sens.com/edge-computing-could-resolve-a-cluster-of-driverless-technology-problems/, 5 pages.
Rudolph, "Three Sensor Types Drive Autonomous Vehicles", FierceElectronics (Nov. 10, 2017), retrieved from: https://www.fierceelectronics.com/components/three-sensor-types-drive-autonomous-vehicles, 14 pages.

* cited by examiner

THREE-DIMENSIONAL ENVIRONMENT MODELING BASED ON A MULTI-CAMERA CONVOLVER SYSTEM

RELATED APPLICATIONS

This is a NONPROVISIONAL of, claims priority to, and incorporates by reference U.S. Provisional Application No. 62/642,578, filed 13 Mar. 2018, and U.S. Provisional Application No. 62/690,509, filed 27 Jun. 2018.

FIELD OF THE INVENTION

The present invention is directed to approaches for constructing a three-dimensional model of the environment of one or more camera devices.

BACKGROUND

Existing systems for inferring or generating semantic models of a camera environment for mapping and analysis are limited—for example, such systems can be slow, rely on low-resolution video, and may not be capable of identifying moving and still objects present in the camera environment, e.g. in a manner that permits querying of the environment model.

Accordingly, there is a need for systems and approaches that provide technical solutions to these problems, and the present application discloses embodiments that address aspects of this need.

SUMMARY

Embodiments are described for, e.g., a system for constructing a three-dimensional environment model. Such as system may comprise a camera device comprising a plurality of image sensors, storage configured to store a convolutional neural network, and a convolver processor operatively coupled to the storage and configured to: using the convolutional neural network, sample a scene frame from a sequence of scene frames generated by the plurality of image sensors; using the convolutional neural network, determine a depth map for each pixel in the scene frame; using the convolutional neural network, determine a set of feature vectors in lower-dimensional feature space, wherein distance between the feature vectors represents visual dissimilarity; determine the optical flow between the scene frame and a key frame based on the feature vectors; determine the six-dimensional transformation of one or more moving objects in the scene frame based on the optical flow, wherein the six-dimensional transformation includes the change in position and change in orientation of the one or more moving objects; and provide updates to a device storing a three-dimensional environment model based on the depth map and the six-dimensional transformation of the one or more moving objects in the scene frame.

DETAILED DESCRIPTION

Figure 1:
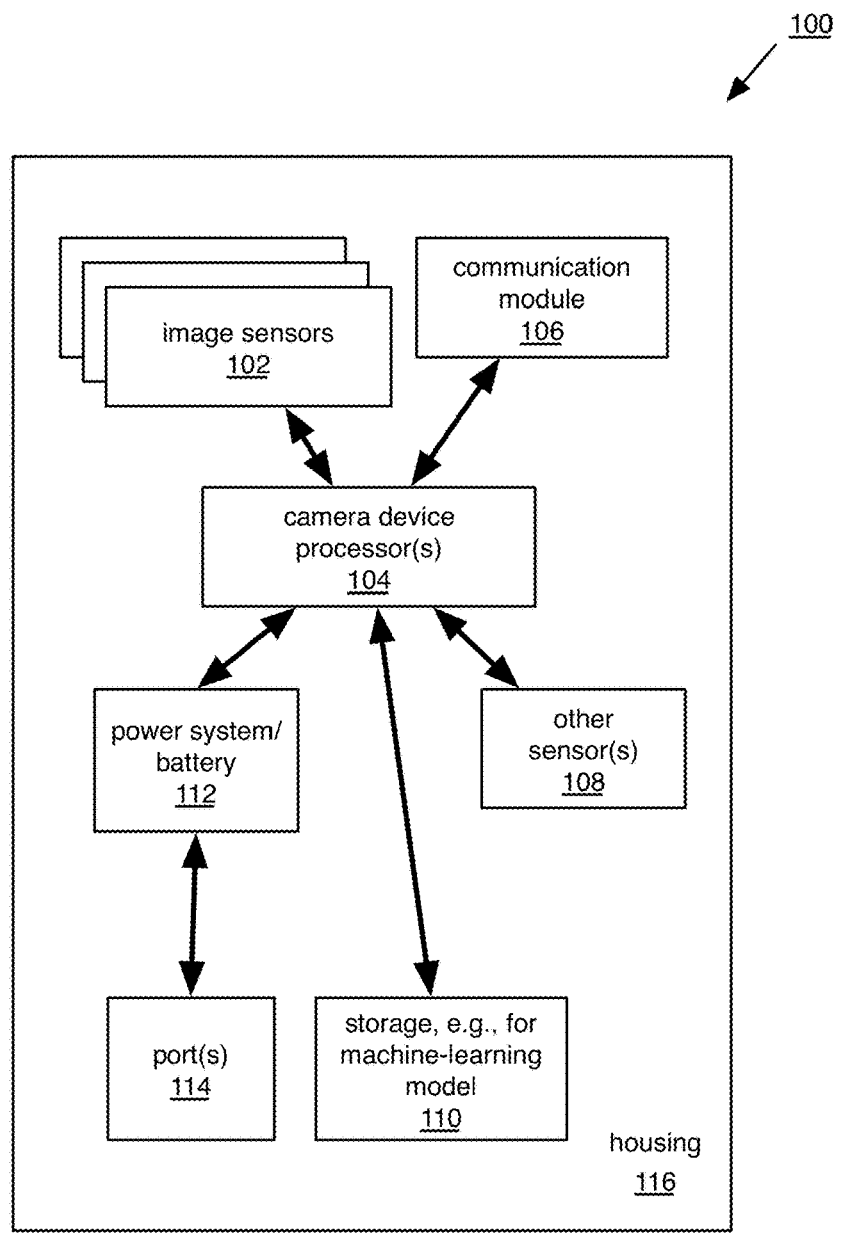
FIG. 1 depicts exemplary components of an image-generating camera device, in accordance with some embodiments of the invention.

Embodiments of apparatuses, computer systems, computer-readable media, and methods for deploying systems for real-time construction and updating of three-dimensional environment models are described. For example, such systems may include multiple camera devices positioned at fixed or moving supports used to generate highly accurate three-dimensional maps of the environment of the camera devices. In certain embodiments, key processing steps involved in simultaneous localization and mapping (SLAM) algorithms are performed by a highly efficient convolver processor integrated into edge devices (e.g., camera devices).

In certain embodiments, the approaches described herein are used to block out the objects and features of the environment (e.g., the real scene or area monitored by cameras) of one or more camera devices to generate a queryable three-dimensional map. For example, each object in the monitoring area may be tagged with a semantic identity and additional properties such as the object's location within the monitoring area, whether the object is static or moving, and if the object is moving, it may be associated with a speed or acceleration in a direction within a coordinate system of the map (and pixels associated with the object may similarly each be associated with a representation of movement along a vector). Each object in the environment may be associated with a depth relative to a camera device, an object orientation relative to the map, and may have various labels identifying the type of object at varying levels of granularity (e.g., individual identification, category identification, supergroup membership). Such a map is queryable, in that it can be queried based on this semantic information to, for example, count cars that are not red, identify children at an amusement park who are throwing objects, and the like. In certain embodiments, portions of the environment model are constructed or determined by computations executed at the nearest camera device. In certain embodiments, inferences or determinations by individual camera devices are combined at a single camera device, a gateway server, or a remote server to build an overall three-dimensional environment model of the monitoring area. In certain embodiments, the three-dimensional environment model may solely include static objects that represent the background for a scene, and in other embodiments, constituent objects are classified as background or non-background objects. In certain embodiments, moving objects may be classified as background objects—e.g., a rotating ceiling fan or falling water in a water fountain. In certain embodiments, by identifying and locating background objects, the system is able to subtract the background objects from its analysis and may then be better able to identify characteristics of non-background objects that may be the subject of further analysis or tracking.

As used herein, a "three-dimensional environment model" is a three-dimensional map of an area, where the area is imageable by one or more camera devices associated with the system. The three-dimensional environmental model includes a semantic description of objects located in the map as well as their absolute locations and/or their locations relative to one another and to the camera. In certain embodiments, the three-dimensional environment model includes a description of object movement and incorporates states for the environment and its contents at particular times or time periods. An "object" is a visually representable item, such as a person, weapon, chair, tree, or building. Instances of an object can be represented in synthetic-domain images (e.g., images generated from a semantic or high-level description of image content using a rendering engine) or in real-domain image data. In certain embodiments, a real-domain image is an image generated by an image sensor based on light information in the environment of the image sensor. In certain embodiments, a real-domain image is a representation of an actual object instance within view of an image sensor and/or the environment within view of an image sensor. As used herein, a "semantic description" is a specification concerning the meaning of the content depicted in the image data or an event involving the depicted content.

FIG. 1 depicts exemplary components of an image-generating camera device 100. Camera device 100 includes two or more image sensors 102 for imaging the environment of device 100. For example, the image sensors 102 may be arranged in the device 100 with a certain spacing between respective sensors in order to enable inference of the depth of objects from device 100 in the environment of device 100. In certain embodiments, corresponding information from image sensors 102 positioned across multiple physical devices may be collected, for example in order to facilitate depth inference. Image sensors 102 may detect grayscale (single channel) light information, color (e.g., RGB, HSV/HSB, HSL, or YUV, to generate three or more color channels), or infrared light information. Image sensors 102 may be capable of providing 4K resolution images (i.e., generating images having at least 4,000 pixels along one dimension), or 10K resolution, or greater. In certain embodiments, camera device 100 may be mounted at a fixed position at a fixed height above the ground. The optical characteristics associated with an image sensor 102 may include, for example, the sensor's resolution, color detection profile, the sensor's position relative to the other sensors of the camera device, lens properties such as a wide angle lens versus a regular lens, type of light information (infrared, visible, etc.), focal length, aperture, and the like.

In certain embodiments, camera device 100 may be mounted on a moving object, such as a person, a vehicle, or a drone; in certain embodiments, camera device 100 is fixed in position at a particular height and x,y location in a monitoring area.

Camera device 100 may include one or more camera device processors 104. In certain embodiments, any of processors 104 may be a special-purpose processor for computing neural network inference calculations, such as a convolver processor. In certain embodiments, processor 104 is a general-purpose processor. Processor 104 may be in communication with image sensors 102, a communication module 106, other sensors 108, a storage component 110, and a power system and/or battery 112. The power system/battery 112 may be in communication with one or more port(s) 114.

Camera device 100 may include one or more other sensors 108, such as a temperature sensor for monitoring thermal load or ambient temperature, an accelerometer, microphone, or the like. Communication module 106 may include a cellular radio, Bluetooth radio, ZigBee radio, Near Field Communication (NFC) radio, wireless local area network (WLAN) radio, a subscriber identity module (SIM) card, GPS receiver, and antennas used by each for communicating data over various networks such as a telecommunications network or wireless local area network. Storage 110 may include one or more types of computer readable medium, such as RAM, optical storage devices, or flash memory, and may store an operating system, applications, communication procedures, and a machine-learning model for inference based on the data generated by image sensors 102 (e.g., a local machine-learning model). The power system/battery 112 may include a power management system, one or more power sources such as a battery and recharging system, AC, DC, a power status indicator, and the like. In certain embodiments, the components of camera device 100 may be enclosed in a single housing 116.

Figure 2:
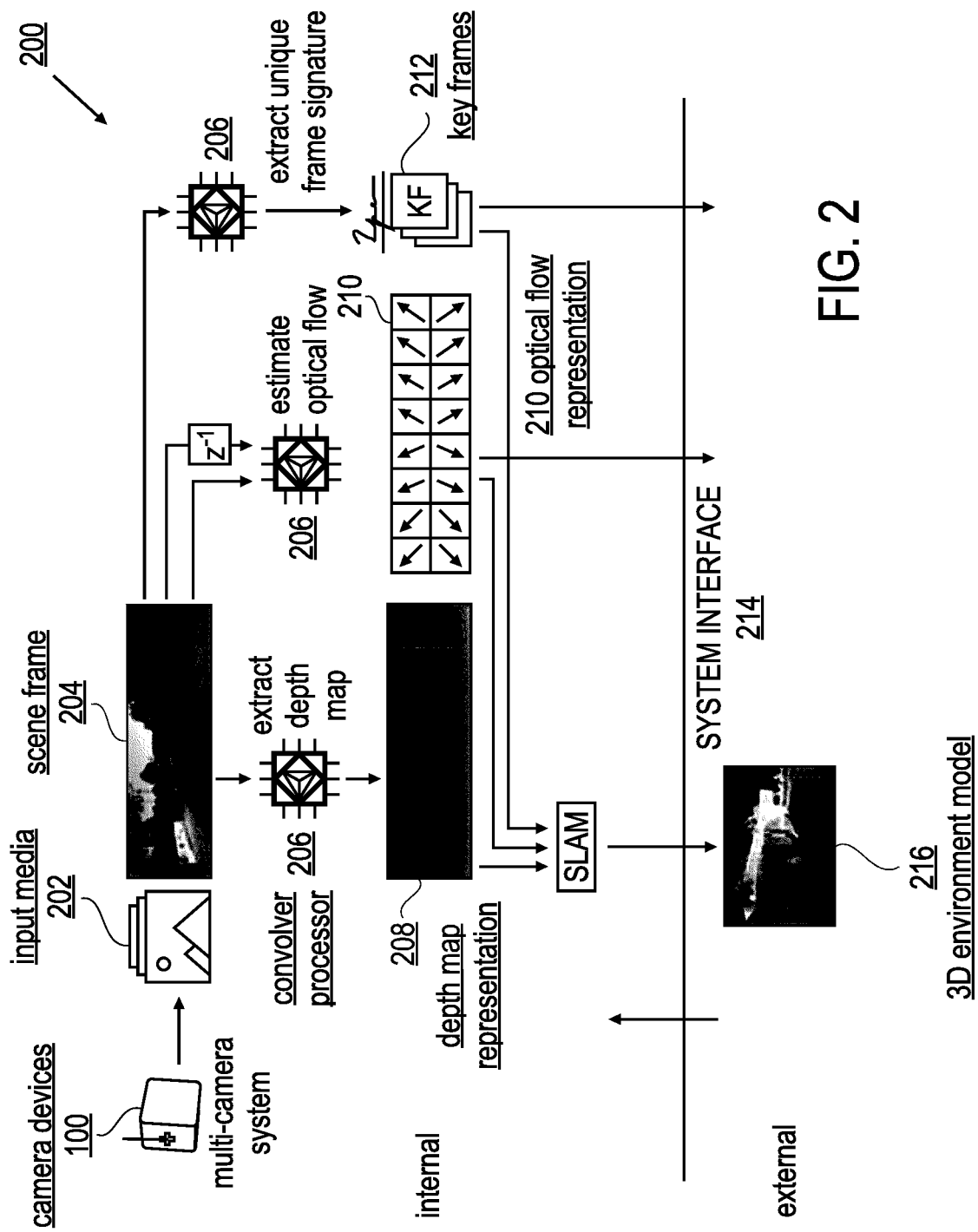
FIG. 2 depicts components of an exemplary system for constructing a three-dimensional environment model, in accordance with some embodiments of the invention.

FIG. 2 depicts components of an exemplary system 200 for constructing a three-dimensional model of an environment (e.g., monitoring area). System 200 includes a plurality of camera devices 100 having sensors with known camera intrinsics and extrinsics (e.g., optical characteristics and mounting characteristics). The sensors 102 and 108 of camera devices 100 in system 200 generate input media 202, which may include video (e.g., a series of images or video stream with associated time parameters or time dimension) and audio data. In certain embodiments, input media 202 additionally includes some description of the previous history of the, e.g., video stream (e.g., a few previous scene frames or partially inferred metadata). Scene frame 204 represents a single frame and associated metadata from input media 202, and provides a snapshot of the view from camera device 100 at a time point. In certain embodiments, each scene frame 204 includes a plurality of images, each image corresponding to each of a plurality of image sensors. In certain embodiments, one or more of the camera devices 100 may be mounted on a mobile actuator or vehicle to map larger areas. In system 200, each camera device 100 includes a processor 104 that is a convolver processor 206. A convolver processor 206 is optimized for convolutional operations and enables real-time, accurate distance estimation of the visible scene (monitoring area) including any instances of objects in the scene. For example, distance/depth estimation and optical flow may be configured to be computed using primarily 3×3 convolutions, because the convolver processor 206 is optimized for 3×3 convolutions. This permits processing of images in their original resolutions (e.g., up to 12 megapixel images) and improved detection of distant objects associated with movement that would be lost at lower resolutions. As a result of using a plurality of camera devices 100, computed relative distance gradients for objects have improved accuracy. In system 200, the internal convolver processor 206 of each camera device 100 is used to extract a depth map, estimate optical flow, and extract unique scene frame signatures based on the input media 202. Depth map representation 208 is a visual representation of a depth map assigning colors to object distances from the camera in, e.g., exemplary scene frame 204. An internal depth map representation may be an array of distances or map coordinates corresponding to each pixel in a scene frame or with respect to any other reference coordinate system (e.g., a three-dimensional point cloud representation). The convolver processor 206 may be used to estimate regional optical flow as a basis for ego-motion tracking (also known as visual odometry). The optical flow between the current scene frame 204 and a matching key frame 212 is the shifting of corresponding pixels between the key frame and the current scene frame. As part of the optical flow determination, convolver processor 206 may be used to map each input scene frame 204 to a lower-dimensional feature space, in which distance between feature vectors represents visual dissimilarity. The computed feature vectors are used for key frame (KF) matching and loop closure. Computing optical flow enables tracking and identifying moving objects in the environment. Optical flow representation 210 may be, for example, an array of vectors corresponding to the change in position for each pixel in a scene frame. Simultaneous localization and mapping (SLAM) algorithms are applied to a depth map representation 208, an optical flow representation 210, and one or more key frames 212 to estimate the transformation with six degrees of freedom (position (x, y, z), and orientation (roll, pitch, yaw)) between the key frame 212 and the current scene frame 204. Each camera 100 of system 200 provides the depth, position, and orientation estimates for each scene frame via a system interface 214 to other components of a distributed system, e.g., for combining information from multiple cameras 100 into an aggregated three-dimensional environment model 216, the model including objects associated with identity and movement metadata. In certain embodiments, one or more cameras 100 may receive external tracking information (e.g., from a remote server or a different camera device 100) via the system interface 214 in order to mitigate localization drift over long distances. For example, if a particular vehicle is being tracked by system 200 as designated by a particular visual signature (e.g., a hash) associated with the vehicle by the system, and the vehicle's license plate is visible in the view of a first camera 100 but occluded in the view of a second camera 100, the second camera 100 may receive data from another component of the system such as a vehicle object associating the license plate with the visual signature. The system may therefore identify the vehicle in view of both cameras (perhaps at different time points) as the same vehicle with the same license plate, even though the license plate is not visible to the second camera. In another example, an additional camera device 100 or alternative sensor device (using, e.g., LIDAR) could be used to record data to augment the data covering the scene, e.g. in a manual (such as a handheld camera) or semi-automated way (e.g., a sensor mounted on a drone or semi-autonomous vehicle), in which the additional/alternative device is introduced into the monitoring area to capture different viewpoints; this data may be integrated into the three-dimensional environment model by, e.g., updating or correcting portions of the model with insufficient or incorrect data.

Figure 3:
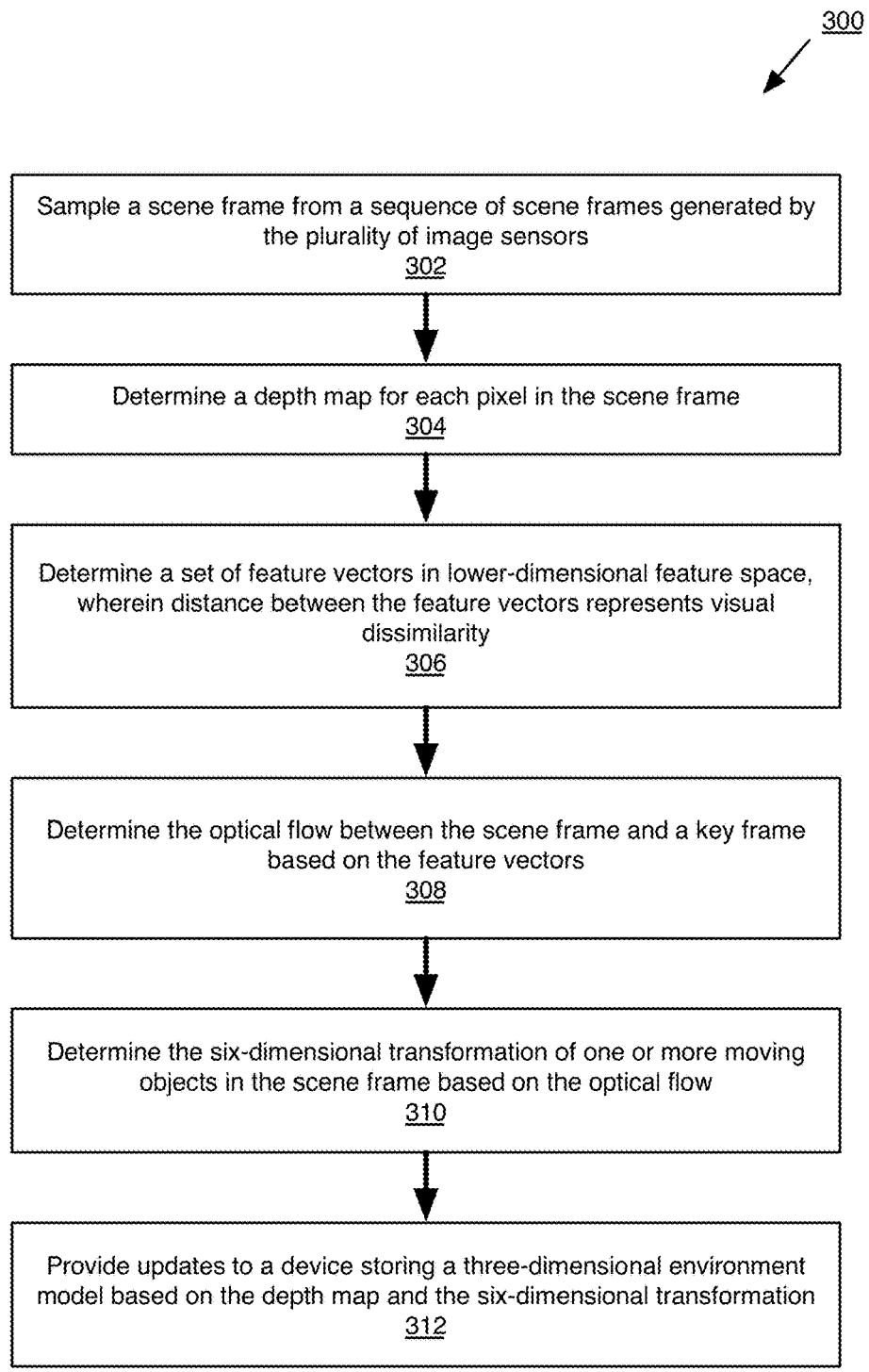
FIG. 3 is a flow chart for an exemplary process concerning a system for constructing a three-dimensional environment model, in accordance with some embodiments of the invention.

FIG. 3 is a flow chart for an exemplary process 300 concerning a system for constructing a three-dimensional environment model. In process 300, a convolver processor of a camera device uses a convolutional neural network to sample a scene frame from a sequence of scene frames generated by the plurality of image sensors of the camera device (302). The convolver processor and neural network may be used to determine a depth map for each corresponding pixel in the scene frame (304). Each scene frame comprises an image associated with each respective image sensor of the camera, where each image was captured at the same time point. Because the various images of each scene frame are each captured from a different perspective, they contain information to infer the depth or distance for corresponding pixels representing the same portion of an object instance across the images of the scene frame. In certain embodiments, scene frames may include images captured by more than one camera device 100 in order to more accurately assess distance. The processor uses the convolutional neural network and scene history to determine a depth map for each pixel in the scene frame. Process 300 additionally includes a step of determining a set of feature vectors in lower-dimensional feature space using the neural network, wherein distance between the feature vectors represents visual dissimilarity (306). Based on the computed feature vectors, the optical flow between the scene frame and a key frame is determined (308). Each key frame may be computed on a per-frame boundary. Using the optical flow, the six-dimensional transformation of moving objects in the scene frame is determined. This transformation includes changes in three-dimensional position (x, y, z) and changes in orientation of the object (roll, pitch, yaw) relative to the key frame (310). Once the depth map and transformations have been determined, the camera device may update an internally stored three-dimensional environment model, or may provide the depth and transformation information to another component of the system to update an aggregate model (312). As a result of using the optimized convolver processor, these determinations are fast and updates can be provided in real-time—e.g., 5 times per second, once per second, 6 times per minute, or every minute.

Figure 4:
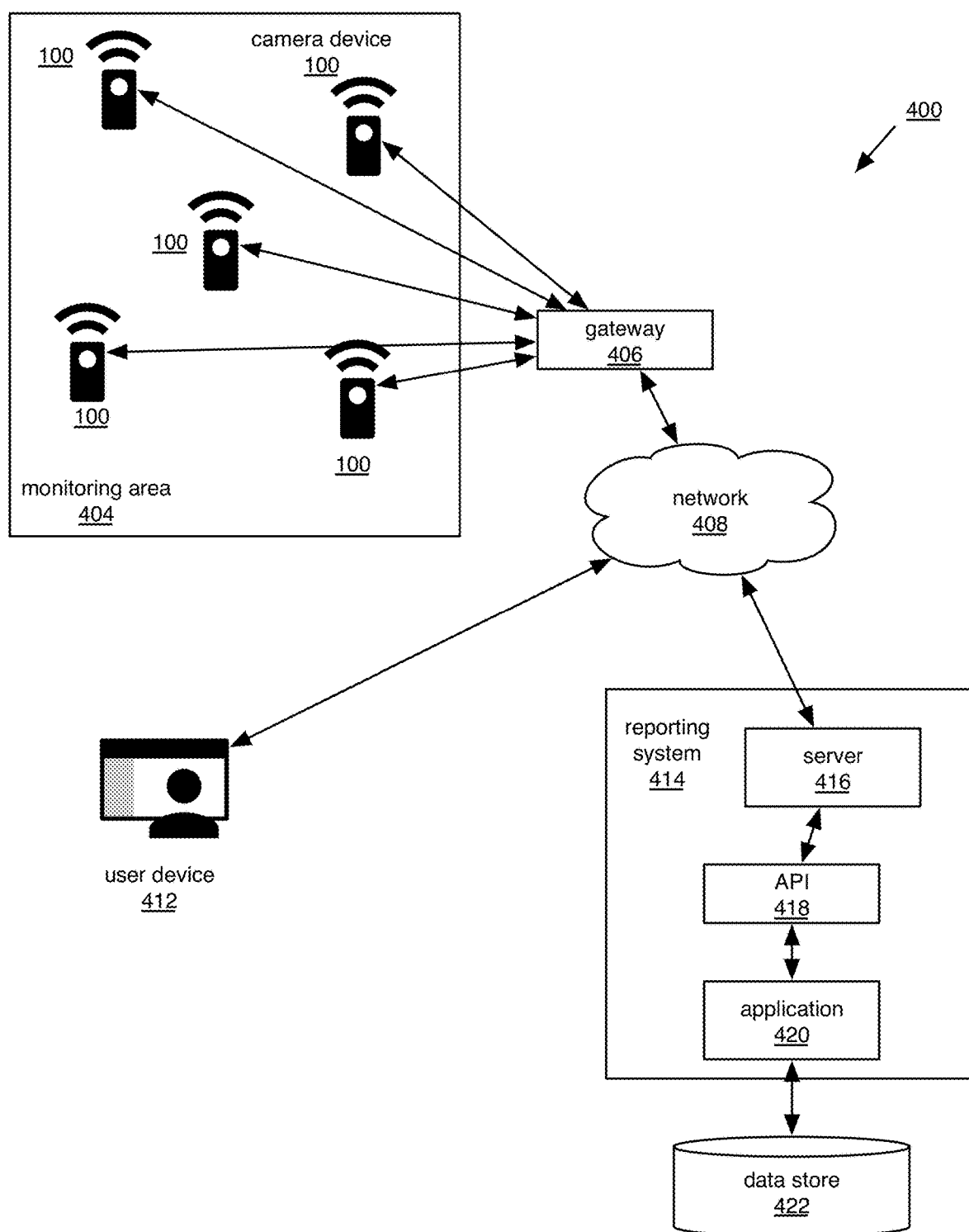
FIG. 4 depicts components of an exemplary distributed system for real-time environment modeling, in accordance with some embodiments of the invention.

FIG. 4 depicts exemplary data flows and components of an exemplary distributed system real-time environment modeling 400. In certain embodiments, a collection of camera devices 100 are placed within a monitoring area 404 (e.g., the potential location of targeted content or the environment of camera device 100). Camera devices 100 may provide notifications or the output of inferences (such as updates to a three-dimensional environment model) to gateway device 406 via wired or wireless communication channels, and may receive updates to their local machine-learning models via those channels. Network 408 represents a telecommunications network, a wired or wireless local area network, or the internet. In certain embodiments, camera devices 100 may connect to network 408 without gateway device 406. In certain embodiments, reporting system 414 runs on a cloud service or one or more computing devices hosting a server 416, such as an HTTP server, and an application 420 that may initiate certain actions (e.g., sending reports to client devices) based on events detected or based on inferences at camera devices 100. For example, defined actions and/or user account information may be stored in data store 422. Application 420 may support an Application Programming Interface (API) 418 providing external access to methods for accessing data store 422. In certain embodiments, client applications running on user device 412 or other client devices may access API 418 via server 416 using protocols such as HTTP or FTP, in order to, e.g., view training system user interfaces or reporting system user interfaces and the like.

Figure 5:
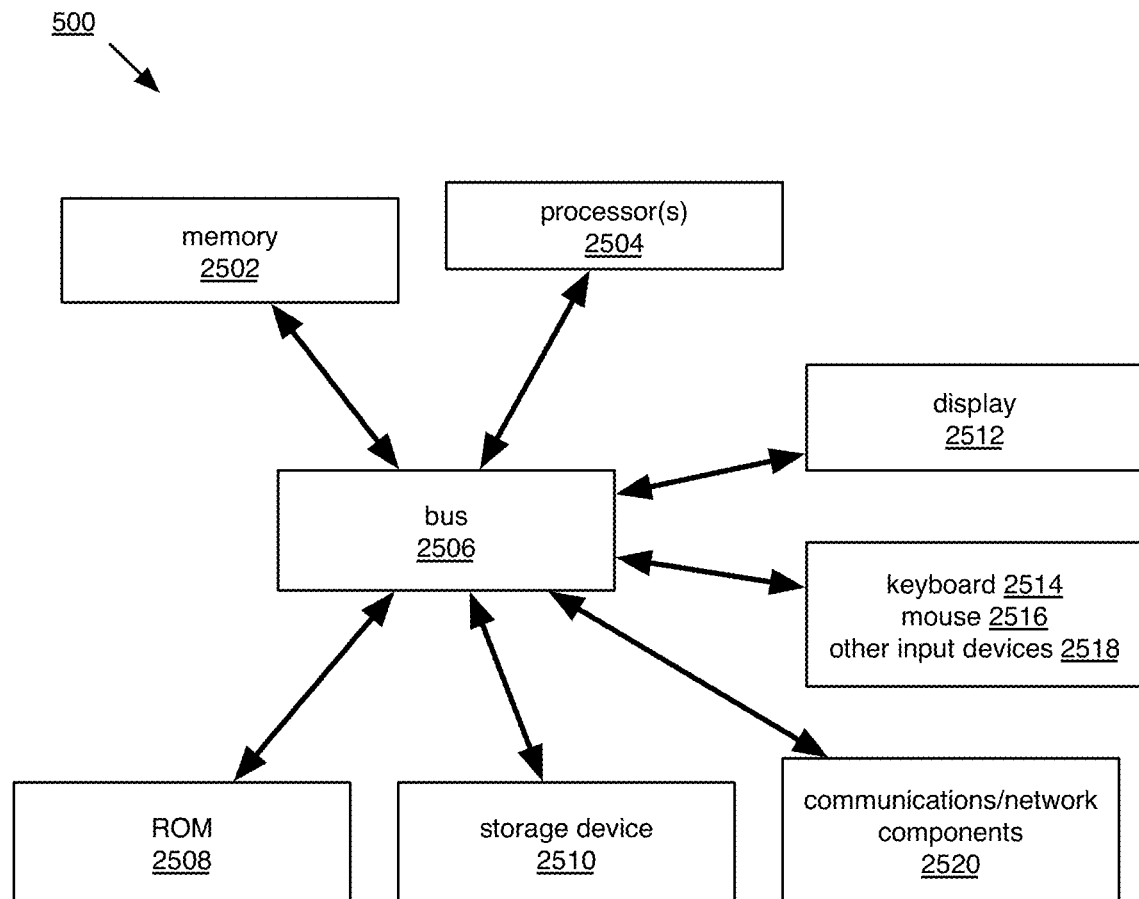
FIG. 5 shows a block diagram of an exemplary computing system, in accordance with some embodiments of the invention.

FIG. 5 is a block diagram showing an exemplary computing system 500 that is representative any of the computer systems or electronic devices discussed herein. Note that not all of the various computer systems have all of the features of system 500. For example, systems may not include a display inasmuch as the display function may be provided by a client computer communicatively coupled to the computer system or a display function may be unnecessary.

System 500 includes a bus 2506 or other communication mechanism for communicating information, and one or more processors 2504 coupled with the bus 2506 for processing information. Computer system 500 also includes a main memory 2502, such as a random access memory or other dynamic storage device, coupled to the bus 2506 for storing information and instructions to be executed by processor 2504. Main memory 2502 also may be used for storing temporary variables or other intermediate information during execution of instructions to be executed by processor 2504.

System 500 may include a read only memory 2508 or other static storage device coupled to the bus 2506 for storing static information and instructions for the processor 2504. A storage device 2510, which may be one or more of a hard disk, flash memory-based storage medium, magnetic tape or other magnetic storage medium, a compact disc (CD)-ROM, a digital versatile disk (DVD)-ROM, or other optical storage medium, or any other storage medium from which processor 2504 can read, is provided and coupled to the bus 2506 for storing information and instructions (e.g., operating systems, applications programs and the like).

Computer system 500 may be coupled via the bus 2506 to a display 2512 for displaying information to a computer user. An input device such as keyboard 2514, mouse 2516, or other input devices 2518 may be coupled to the bus 2506 for communicating information and command selections to the processor 2504. Communications/network components 2520 may include a network adapter (e.g., Ethernet card), cellular radio, Bluetooth radio, NFC radio, GPS receiver, and antennas used by each for communicating data over various networks, such as a telecommunications network or LAN.

The processes referred to herein may be implemented by processor 2504 executing appropriate sequences of computer-readable instructions contained in main memory 2502. Such instructions may be read into main memory 2502 from another computer-readable medium, such as storage device 2510, and execution of the sequences of instructions contained in the main memory 2502 causes the processor 2504 to perform the associated actions. In alternative embodiments, hard-wired circuitry or firmware-controlled processing units (e.g., field programmable gate arrays) may be used in place of or in combination with processor 2504 and its associated computer software instructions to implement the invention. The computer-readable instructions may be rendered in any computer language including, without limitation, Python, Objective C, C#, C/C++, Java, Javascript, assembly language, markup languages (e.g., HTML, XML), and the like. In general, all of the aforementioned terms are meant to encompass any series of logical steps performed in a sequence to accomplish a given purpose, which is the hallmark of any computer-executable application. Unless specifically stated otherwise, it should be appreciated that throughout the description of the present invention, use of terms such as "processing", "computing", "calculating", "determining", "displaying", "receiving", "transmitting" or the like, refer to the action and processes of an appropriately programmed computer system, such as computer system 500 or similar electronic computing device, that manipulates and transforms data represented as physical (electronic) quantities within its registers and memories into other data similarly represented as physical quantities within its memories or registers or other such information storage, transmission or display devices.

While the preferred embodiments have been shown and described, it will be understood that there is no intent to limit the invention by such disclosure, but rather, is intended to cover all modifications and alternate constructions falling within the spirit and scope of the invention.

What is claimed is:

1. A method for updating a three-dimensional model of an environment within which a camera is situated, the camera having a plurality of image sensors and a convolver processor that uses a neural network, the method comprising:
    receiving, by the convolver processor that uses the neural network, a plurality of scene frames, each of the scene frames including a plurality of images, and each image corresponding to a respective one of the plurality of image sensors of the camera, wherein the image sensors of the camera are spaced apart from one another;
    extracting, by the convolver processor that uses the neural network, a depth map of a current scene depicted in a current scene frame based on at least two images measured by two distinct ones of the image sensors of the camera;
    estimating, by the convolver processor that uses the neural network, an optical flow between the current scene frame and an associated key frame by:
        determining feature vectors of the current scene frame in a space that is lower in dimension than the current scene frame, in which distance between the feature vectors of the current scene frame represents visual dissimilarity of objects within the current scene frame;
        identifying the associated key frame based on the determined feature vectors of the current scene frame; and
        estimating the optical flow as an array of vectors representing a change in position of each pixel in the current scene frame relative to a corresponding pixel in the associated key frame;
    applying a simultaneous localization and mapping (SLAM) algorithm to the current scene frame, as represented by the extracted depth map and estimated optical flow, and to the associated key frame so as to determine an orientation estimate between the associated key frame and the current scene frame in six dimensions, including x-, y- and z-positions and roll, pitch and yaw orientations; and
    updating the three-dimensional environment model using the extracted depth map of the current scene frame and the six-dimensional orientation estimate between the associated key frame and the current scene frame.

2. The method of claim 1, further comprising the camera receiving tracking information from a server or another camera.

3. The method of claim 1, further comprising determining a six-dimensional transformation of moving objects in one or more of the plurality of scene frames based on the estimated optical flow.

4. The method of claim 3, wherein a plurality of objects are captured in the plurality of scene frames.

5. The method of claim 4, further comprising, for each of the objects, tagging the object with a semantic description of the object.

6. The method of claim 4, further comprising, for each of the objects, tagging the object with an absolute location of the object or a location of the object relative to the camera.

7. The method of claim 4, further comprising, for each of the objects, tagging the object with a status regarding whether the object is static or moving.

8. The method of claim 7, further comprising, for each of the objects that are moving, tagging the moving object with one or more of a speed and an acceleration of the object.

9. The method of claim 1, wherein the three-dimensional model of the environment includes a three-dimensional map of the environment.

10. The method of claim 9, further comprising receiving a query for an object represented in the three-dimensional map of the environment, and in response to receiving the query for the object, returning information regarding the object, wherein the information includes one or more of a semantic description of the object, a location of the object, a status regarding whether the object is static or moving, a speed of the object, or an acceleration of the object.

11. The method of claim 1, further comprising integrating data measured by a sensor device other than the camera into the three-dimensional environment model.

12. The method of claim 11, wherein the sensor device is a light detection and ranging (LIDAR) sensor.

13. A camera for updating a three-dimensional model of an environment within which the camera is situated, the camera having a plurality of image sensors and one or more processors, the one or more processors configured to:
    receive a plurality of scene frames, each of the scene frames including a plurality of images, and each image corresponding to a respective one of the plurality of image sensors of the camera, wherein the image sensors of the camera are spaced apart from one another;
    extract, using a convolutional neural network, a depth map of a current scene depicted in a current scene frame based on at least two images measured by two distinct ones of the image sensors of the camera;
    estimate, using the convolutional neural network, an optical flow between the current scene frame and an associated key frame by:
        determining feature vectors of the current scene frame in a space that is lower in dimension than the current scene frame, in which distance between the feature vectors of the current scene frame represents visual dissimilarity of objects within the current scene frame;
        identifying the associated key frame based on the determined feature vectors of the current scene frame; and
        estimating the optical flow as an array of vectors representing a change in position of each pixel in the current scene frame relative to a corresponding pixel in the associated key frame;
    apply a simultaneous localization and mapping (SLAM) algorithm to the current scene frame, as represented by the extracted depth map and estimated optical flow, and to the associated key frame so as to determine an orientation estimate between the associated key frame and the current scene frame in six dimensions, including x-, y- and z-positions and roll, pitch and yaw orientations; and
    update the three-dimensional environment model using the extracted depth map of the current scene frame and the six-dimensional orientation estimate between the associated key frame and the current scene frame.

14. The camera of claim 13, wherein the at least two images measured by the two distinct ones of the image sensors of the camera are measured at a common time point.

15. The camera of claim 13, wherein the plurality of scene frames includes a first scene frame from a first time point and a second scene frame from a second time point, the first time point being different from the second time point.

16. The camera of claim 13, wherein the one or more processors are further configured to perform ego-motion tracking based on the determined optical flow.

* * * * *